United States Patent
Romo

(10) Patent No.: US 12,247,594 B2
(45) Date of Patent: Mar. 11, 2025

(54) PULSE WIDTH MODULATED CONTROL OF SERVO

(71) Applicant: Hamilton Sundstrand Corporation, Charlotte, NC (US)

(72) Inventor: Francisco X. Romo, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 282 days.

(21) Appl. No.: 17/670,308

(22) Filed: Feb. 11, 2022

(65) Prior Publication Data

US 2023/0258205 A1  Aug. 17, 2023

(51) Int. Cl.
*F15B 21/08* (2006.01)
*F15B 13/04* (2006.01)

(52) U.S. Cl.
CPC ........ *F15B 21/087* (2013.01); *F15B 13/0401* (2013.01); *F15B 2013/0409* (2013.01); *F15B 2211/427* (2013.01); *F15B 2211/605* (2013.01); *F15B 2211/634* (2013.01); *F15B 2211/6656* (2013.01)

(58) Field of Classification Search
CPC ............... F15B 21/087; F15B 13/0401; F15B 2013/0409; F15B 2211/427; F15B 2211/605; F15B 2211/634; F15B 2211/6656
See application file for complete search history.

(56) References Cited

U.S. PATENT DOCUMENTS

| | | |
|---|---|---|
| 4,373,697 A | 2/1983 | Phelps |
| 5,023,535 A | 6/1991 | Miller et al. |
| 5,361,579 A * | 11/1994 | Bachelder ............... F02C 9/28 60/39.281 |
| 6,021,799 A | 2/2000 | Price |
| 7,377,480 B2 | 5/2008 | Tabor et al. |
| 10,114,386 B2 | 10/2018 | Summers et al. |
| 11,174,793 B2 | 11/2021 | Ajami et al. |
| 2002/0002817 A1 * | 1/2002 | Keller ..................... F02C 9/28 60/772 |
| 2004/0075070 A1 | 4/2004 | Munsterhuis |
| 2009/0134848 A1 * | 5/2009 | Boisvert ............ F16H 61/4035 91/499 |
| 2013/0268122 A1 * | 10/2013 | Desai ..................... G05B 15/02 700/275 |
| 2016/0299512 A1 * | 10/2016 | Summers ............ B64C 13/503 |
| 2021/0006130 A1 * | 1/2021 | Flower ................ G05D 16/101 |
| 2021/0381439 A1 | 12/2021 | Ajami et al. |
| 2022/0243610 A1 * | 8/2022 | Krzywon ............. F01D 21/003 |
| 2023/0179064 A1 * | 6/2023 | Kelly ..................... H02K 9/19 310/54 |

FOREIGN PATENT DOCUMENTS

EP 77770 A1 5/1983

OTHER PUBLICATIONS

Extended European Search Report issued in corresponding EP Patent Application No. 23156308.1 on Jun. 9, 2023.

* cited by examiner

*Primary Examiner* — Zoheb S Imtiaz

(57) ABSTRACT

In accordance with at least one aspect of this disclosure, a system includes, a servo configured to control a position of a valve, a driver operatively connected to control movement of the servo, a control module operatively connected to control the driver, can configured to control the driver with pulse width modulated output to control a frequency of a generator through movement of the servo.

20 Claims, 1 Drawing Sheet

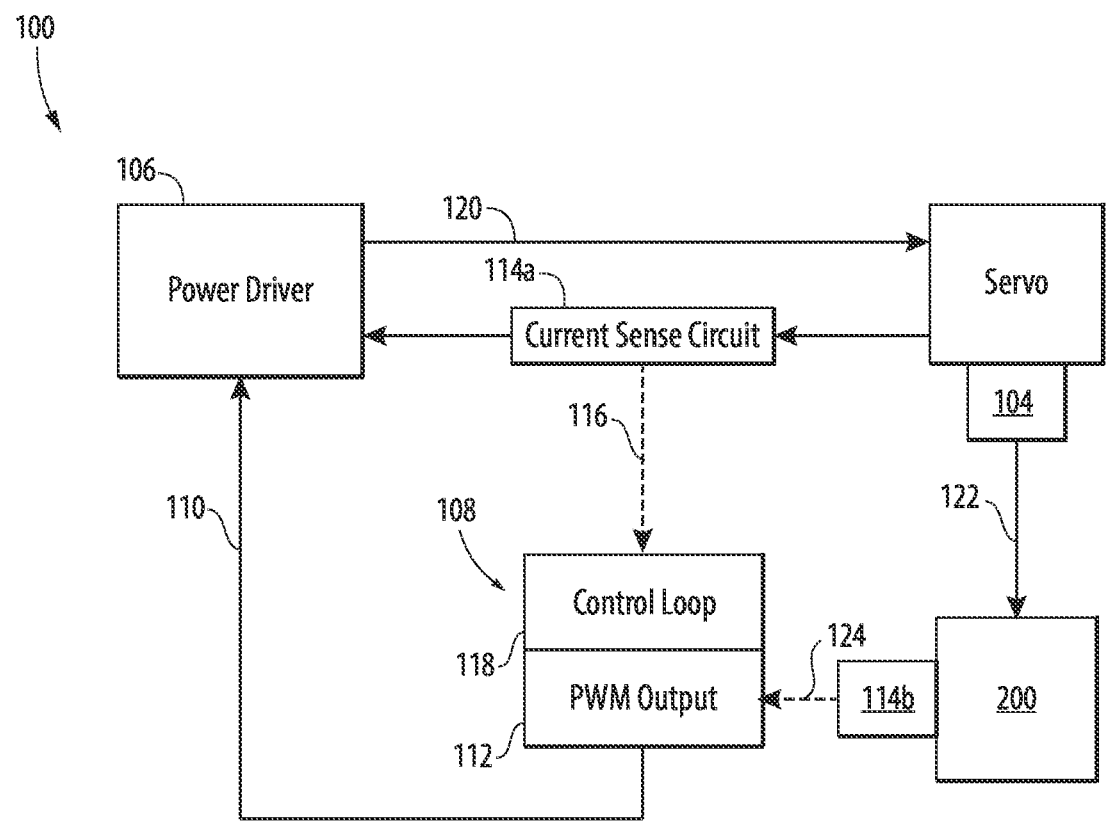

PULSE WIDTH MODULATED CONTROL OF SERVO

STATEMENT OF GOVERNMENT RIGHTS

This invention was made with government support. The government has certain rights in the invention.

TECHNICAL FIELD

The present disclosure relates to control method of a servo valve used to control output frequency of an aircraft generator, and more particularly to, pulse width modulation control of said servo valve.

BACKGROUND

Typically, an aircraft generator control unit utilizes a linear driver to control current into a servo valve. Such servo valve ultimately controls the generator output frequency. Because such systems include a linear driver, circuit board space is considerable, and power dissipation can lead to inefficiency of the circuit overall.

Thus, there remains a need in the art for improved servo control in aircraft generator control units. This disclosure provides a solution for this need.

SUMMARY

In accordance with at least one aspect of this disclosure, a system includes a servo configured to control a position of a valve, a driver operatively connected to control movement of the servo, and a control module operatively connected to control the driver, can configured to control the driver with pulse width modulated output to control a frequency of a generator through movement of the servo.

In embodiments, the system includes the generator operatively connected to receive fluid from the valve, and the servo can be configured to control a flow of the fluid to the generator through the valve. In certain embodiments, the fluid includes oil.

In embodiments, one or more sensors can be operatively connected to sense and output a signal indicative of the frequency of the generator, wherein the control module is configured to control the driver based at least in part on the signal indicative of the frequency of the generator. The control module can be configured to control the driver to adjust a position of the valve, to change the frequency of the generator, based at least in part on the signal indicative of the frequency and/or speed of the generator.

In embodiments, the control module further includes a switching module configured to produce the pulse width modulated output. The system can include one or more sensors operatively connected to sense one or more conditions of the servo and output a signal indicative of the one or more conditions of the servo. In certain embodiments, the control module can be configured to control the switching module based at least in part on the signal indicative of the one or more conditions of the servo.

In embodiments, one of the one or more sensors can include a current sense circuit operatively connected to sense a current supplied to the servo and output a signal indicative of the current supplied to the servo. In certain such embodiments, one of the one or more conditions of the servo includes the current supplied to the servo.

A feedback module can be operatively connected to receive signal indicative of the current supplied to the servo, wherein the control module is configured to control the switching module for pulse width modulated output to the driver based at least in part on the current supplied to the servo.

In accordance with at least one aspect of this disclosure, a method can include driving a servo to adjust a position of a valve with pulse width modulated output to control a frequency of a generator. The method can further include supplying flow of a fluid to the generator via the valve, such that controlling the frequency of the generator includes adjusting the flow of fluid supplied to the generator.

In embodiments, the method includes controlling a switching module to produce the pulse width modulated output. In certain embodiments, the method can include sensing, with one or more sensors operatively connected between the servo and the driver, one or more conditions of the servo. In certain such embodiments, the method can include driving the servo with pulse width modulated output based at least in part on the one or more conditions of the servo.

In certain embodiments, the one or more conditions of the servo can include a current supplied to the servo. In embodiments, the method can include sensing, with a sensing circuit operatively connected between the servo and the driver, the current supplied to the servo, such that driving can further include, driving the servo with pulse width modulated output based at least in part on the current supplied to the servo.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain FIGS., wherein:

FIG. 1 is a block diagram in accordance with this disclosure, showing an embodiment of a generator system having a servo valve.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are described herein. Certain embodiments described herein can provide a pulse-width modulated method for controlling generator servo valve.

In accordance with at least one aspect of this disclosure, a system 100 can include a servo 102 configured to control a position of a valve 104, a driver 106 operatively connected to control movement of the servo 102, and a control module 108 operatively connected to control the driver 106. In embodiments, the control module 108 configured to control the driver 106 with pulse width modulated output 110 to control a frequency of a generator via the movement of the servo 102.

In embodiments, the control module 108 can include switching module 112, where the control module 108 is configured to operate the switching module 112 to produce the pulse width modulated output 110. In certain embodiments, one or more sensors 114 can be operatively connected to sense one or more conditions of the servo and output a signal 116 indicative of the one or more conditions of the servo 102, such that the control module 108 is configured to control the switching module 112 based at least in part on the signal indicative of the one or more conditions of the servo 102. A feedback module 118 can be operatively connected to receive the signal 116 indicative of the one or more conditions of the servo 102, such that the control module is configured to control the switching module 112 for pulse width modulated output to the driver 106 based at least in part on the signal 116 indicative of the one or more conditions of the servo 102.

In certain embodiments, a sensor 114a of the one or more sensors 114 can include a current sense circuit operatively connected to sense a current 120 supplied to the servo 102 and output a signal 116 indicative of the current supplied to the servo 102. Here, one of the one or more conditions of the servo includes the current supplied to the servo.

In embodiments, a generator 200 can be operatively connected to receive fluid from the valve 104 via a fluid circuit 122, and the servo 102 can be configured to control a flow of the fluid to the generator 200 through the valve 104. In embodiments, the fluid can include oil. In certain such embodiments, a sensor 114b of the one or more sensors 114 can include a frequency and/or speed sensor operatively connected to sense and output a signal 124 indicative of a frequency and/or speed of the generator 200. The control module 108 can then be configured to control the switching module 112 based at least in part on the signal 124 indicative of the frequency and/or speed of the generator 200, wherein oil flow through the servo valve 104 is directly related to the frequency and/or speed of the generator 200. Accordingly, the control module 108 can be configured to control the driver 106 to adjust the position of the valve 104, using the servo 102, based at least in part on the signal 122 indicative of the frequency and/or speed of the generator 102 (e.g., via the feedback module 118).

In embodiments, the control module 108 and/or other components of system 100 can be or include both hard wired circuits that cause a logic (e.g. predictive) to be executed, and/or software-based components, for example, simple electric circuits employing analogue components, or the controller can include a CPU, a memory, machine readable instructions in the memory that when executed cause the CPU to perform a method or cause the control module 108 to perform a method, for example as described below. In embodiments, the control module 108 can utilize any suitable algorithm to control the switching module 112 and driver 106 as provided herein. In embodiments, the algorithm could be constructed using the functionality as described above in addition to known general engineering principles as applied to the specific characteristics of each particular system to which the technology of the present disclosure is applied.

In accordance with at least one aspect of this disclosure, a method can include, driving a servo (e.g., servo 102) to adjust a position of a valve (e.g., valve 104) with pulse width modulated output (e.g., output 110) to control a frequency of a generator. In embodiments, driving can include, controlling a switching module (e.g., switching module 112) to produce the pulse width modulated output. In embodiments, the control module 108 can be configured to perform the method, for example via machine readable instructions.

In certain embodiments, the method can include sensing one or more conditions of the servo, with one or more sensors (e.g., sensors 114) operatively connected between at least the servo and the driver. In certain such embodiments, driving can further include, driving the servo with pulse width modulated output based at least in part on the one or more conditions of the servo, the current being sensed by a sensor including a current sensing circuit (e.g., sensor 114a). In certain embodiments, the one or more conditions of the servo includes a current supplied to the servo. In certain embodiments, and the method can include, driving the servo with pulse width modulated output based at least in part on the on the current supplied to the servo. In embodiments, the method can include supplying flow of a fluid to a generator (e.g., generator 200) via the valve, such that controlling the frequency of the generator includes adjusting the flow of fluid supplied to the generator.

Embodiments implement a switching driver using pulse-width modulation to regulate current through a servo valve (an inductive load). The current going to the servo is fed back to the control module (e.g., having PWM control logic) to regulate current suppled to the servo. Embodiments can reduce power dissipation and driver circuit board space by using PWM to regulate current through the servo valve, as opposed to using a linear driver, for example.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A system, comprising:
   a servo configured to control a position of a valve;
   a generator operatively connected to receive fluid from the valve;
   a driver operatively connected to control movement of the servo;
   one or more sensors operatively connected to sense and output a signal indicative of a frequency of the generator; and
   a control module operatively connected to control the driver, the control module configured to control the driver with pulse width modulated output to control the frequency of the generator through movement of the servo based at least in part on the signal indicative of the frequency of the generator.

2. The system of claim 1, wherein the servo is configured to control a flow of the fluid to the generator through the valve.

3. The system of claim 2, wherein the fluid includes oil.

4. The system of claim 1, wherein a flow of the fluid is directly related to the frequency of the generator.

5. The system of claim 1, wherein the control module is configured to control the driver to adjust the position of the valve, to change the frequency of the generator, based at least in part on the signal indicative of the frequency of the generator.

6. The system of claim 1, wherein the control module further includes a switching module configured to produce the pulse width modulated output.

7. The system of claim 6, further comprising one or more sensors operatively connected to sense one or more conditions of the servo and output a signal indicative of the one or more conditions of the servo, wherein the control module is configured to control the switching module based at least in part on the signal indicative of the one or more conditions of the servo.

8. The system of claim 7, wherein one of the one or more sensors includes a current sense circuit operatively connected to sense a current supplied to the servo and output a signal indicative of the current supplied to the servo, wherein one of the one or more conditions of the servo includes the current supplied to the servo.

9. The system of claim 8, further comprising a feedback module operatively connected to receive a signal indicative of the current supplied to the servo, wherein the control module is configured to control the switching module for pulse width modulated output to the driver based at least in part on the current supplied to the servo.

10. A method comprising:
    sensing, with one or more sensors, one or more conditions of a servo;
    driving the servo to adjust a position of a valve with pulse width modulated output to control a frequency of a generator, wherein driving the servo comprises driving the servo with the pulse width modulated output based at least in part on the one or more conditions of the servo; and
    supplying flow of a fluid to the generator via the valve.

11. The method of claim 10, wherein the frequency of the generator is controlled to adjust the flow of the fluid supplied to the generator.

12. The method of claim 10, wherein driving the servo includes controlling a switching module to produce the pulse width modulated output.

13. The method of claim 10, wherein the flow of the fluid is directly related to the frequency of the generator.

14. The method of claim 10, wherein the one or more conditions of the servo include a current supplied to the servo.

15. The method of claim 14, further comprising sensing, with a sensing circuit operatively connected between the servo and a driver, the current supplied to the servo, wherein driving the servo further includes driving the servo with the pulse width modulated output based at least in part on the current supplied to the servo.

16. A non-transitory machine readable medium containing instructions that when executed cause at least one processor to:

drive a servo to adjust a position of a valve with pulse width modulated output to control a frequency of a generator, wherein the generator receives a flow of a fluid via the valve;

wherein the instructions that when executed cause the at least one processor to drive the servo include instructions that when executed cause the at least one processor to drive the servo with the pulse width modulated output based at least in part on one or more conditions of the servo as sensed using one or more sensors.

17. The non-transitory machine readable medium of claim 16, wherein the instructions when executed cause the at least one processor to control the frequency of the generator to adjust the flow of the fluid supplied to the generator.

18. The non-transitory machine readable medium of claim 16, wherein the instructions when executed cause the at least one processor to drive the servo include:

instructions when executed cause the at least one processor to control a switching module to produce the pulse width modulated output.

19. The non-transitory machine readable medium of claim 16, wherein the flow of the fluid is directly related to the frequency of the generator.

20. The non-transitory machine readable medium of claim 16, wherein the one or more conditions of the servo include a current supplied to the servo.

* * * * *